G. A. COFFMAN.
MACHINE FOR CUTTING SAUSAGE MEAT.

No. 3,935.

Patented Feb. 28, 1845.

UNITED STATES PATENT OFFICE.

GEORGE A. COFFMAN, OF MIDDLEBROOK, VIRGINIA.

IMPROVEMENT IN MACHINES FOR CUTTING SAUSAGE-MEAT.

Specification forming part of Letters Patent No. 3,935, dated February 28, 1845.

*To all whom it may concern:*

Be it known that I, GEORGE A. COFFMAN, of near Middlebrook, in the county of Augusta and State of Virginia, have invented a new and useful Improvement in Machines for Cutting Sausage-Meat, which is described as follows, reference being had to the annexed drawings of the same, making part of this specification.

Figure 1:
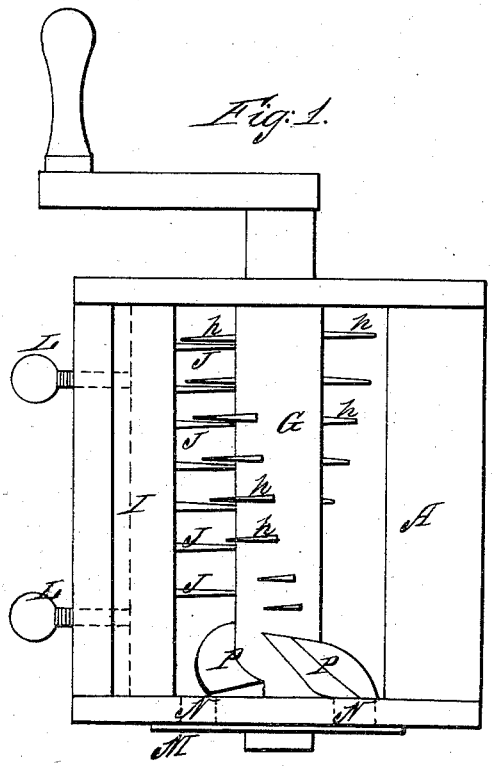
Figure 2:
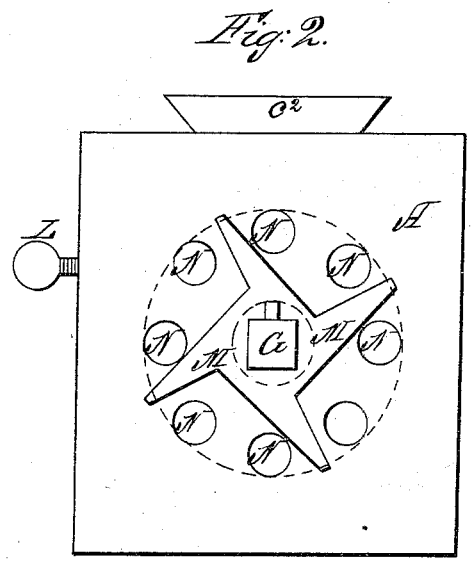
Figure 3:
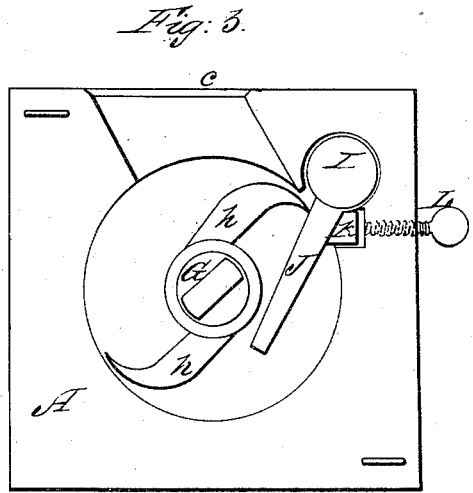

Figure 1 is a bird's-eye view of the machine, showing the interior thereof, the top being removed. Fig. 2 is an elevation of the discharging end of the machine, showing the discharging-apertures and the revolving knives on the outer end of the shaft for cutting the meat as it passes through or out at said apertures. Fig. 3 is a vertical transverse section showing the hollow cylinder wherein the meat is cut and the revolving cylinder of bill-hook cutters for cutting the meat, and the roller containing a row of straight inclined knives, against which the bill-hook cutters act, and a slide against which said inclined cutters rest, and screws for moving said slide for changing the angle of inclination of the knives.

The block A, in which the hollow cylinder is made and within which the meat is to be cut, and the aperture C, in which the feeding-hopper $C^2$ is placed, and the revolving cylinder G, containing the bill-hooks or hawk's-bill-shaped cutters for cutting the meat in the manner of a pair of shears against the straight inclined blades J, and the cranks for turning said cylinders being made in the usual manner, need not therefore be particularly described.

The invention and improvement in the machine that I have made consist in combining and arranging a longitudinal parallel vibrating roller I, containing a row of straight inclined blades J, in a corresponding cylindrical aperture made in the block A, parallel with the cylinder G, above and forward of the same, said roller vibrating in said aperture as the blades are raised or lowered, which is effected by means of a sliding gage-rest K, against which the blades rest, moved horizontally back or forth in a corresponding groove in the block for the purpose of changing the angle of inclination of the blades at pleasure, effected by horizontal set-screws L, passing through the block and acting against the slide, by which the lower ends of the blades are also brought nearer to or receded farther from the cylinder of cutters, as may be desired, the blades being shaped and inserted into the roller and adjusted in relation to the hawk-bill cutters in such a manner that said cutters shall operate against the edges of the blades in the manner of shears for cutting the meat. The said roller of blades can be removed from the block whenever the blades require cleaning or sharpening, or for any other purpose. The cutters are shaped like the bill of a hawk, and are inserted in the circumference of the cylinder in spiral lines.

Another improvement that I have made consists in putting on the end of the revolving cylinder a plate M, having a number of beveled cutting-edges for cutting the meat still finer as it is forced through the circle of discharging-apertures N, against which said plate revolves. This plate is perforated in the middle with a square aperture the size of the end of the cylinder, which is made of corresponding shape, over which the plate is put and secured by a washer and nut or other means.

Spiral wings P are formed on the lower end of the cylinder next the discharging-apertures for pushing or forcing the meat through the machine and out at the aforesaid discharging-apertures N.

The discharging-apertures are arranged in a circle around the shaft or axis of the cylinder, passing through the end of the block opposite to that at which the feeding-hopper is placed.

What I claim as my invention, and which I desire to secure by Letters Patent, consists—

In the combination of the adjustable vibrating roller of inclined blades J, with the revolving cylinder of cutters $h$, arranged and operated in the manner set forth.

GEORGE A. COFFMAN.

Witnesses:
WM. P. ELLIOT,
ALBERT E. JOHNSON.